United States Patent
Wu (10) Patent No.: US 8,432,906 B2
(45) Date of Patent: Apr. 30, 2013

(54) METHOD AND APPARATUS FOR SENDING BFD PACKETS, METHOD AND APPARATUS FOR DETECTING LINK FAULTS

(75) Inventor: Jie Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 328 days.

(21) Appl. No.: 12/814,847

(22) Filed: Jun. 14, 2010

(65) Prior Publication Data

US 2010/0246577 A1 Sep. 30, 2010

Related U.S. Application Data

(63) Continuation of application No. PCT/CN2008/073453, filed on Dec. 11, 2008.

(30) Foreign Application Priority Data

Dec. 14, 2007 (CN) .......................... 2007 1 0199576

(51) Int. Cl.
*H04L 12/56* (2006.01)

(52) U.S. Cl.
USPC ............ 370/389; 370/242; 370/250; 370/431

(58) Field of Classification Search ................ 370/218, 370/241, 389, 395.31; 438/439
See application file for complete search history.

(56) References Cited

U.S. PATENT DOCUMENTS

| | | | |
|---|---|---|---|
| 7,561,527 B1 * | 7/2009 | Katz et al. ..................... | 370/241 |
| 2002/0152321 A1 | 10/2002 | Le et al. | |
| 2007/0180105 A1 | 8/2007 | Filsfils et al. | |
| 2007/0189177 A1 | 8/2007 | Zhai | |
| 2007/0207591 A1 * | 9/2007 | Rahman et al. ............... | 438/439 |
| 2009/0010153 A1 * | 1/2009 | Filsfils et al. ................. | 370/218 |
| 2009/0046723 A1 * | 2/2009 | Rahman et al. .......... | 370/395.31 |
| 2009/0279542 A1 * | 11/2009 | Wong et al. .................... | 370/389 |
| 2010/0149992 A1 | 6/2010 | Tan | |

FOREIGN PATENT DOCUMENTS

| | | |
|---|---|---|
| CN | 1913457 A | 2/2007 |
| CN | 101030966 A1 | 9/2007 |
| EP | 1863225 A1 | 12/2007 |
| EP | 1 914 939 A1 | 4/2008 |

OTHER PUBLICATIONS

Supplemental European Search Report dated (mailed) Nov. 9, 2010, issued in related Application No. 08871033.0-2416, PCT/CN2008/073453, filed Dec. 11, 2008, Huawei Technologies Co., Ltd.

Written Opinion of the International Searching Authority (translation) dated (mailed) Mar. 19, 2009, issued in related application No. PCT/CN2008/073453, filed Dec. 11, 2008, Huawei Technologies Co., Ltd.

(Continued)

*Primary Examiner* — Hassan Kizou
*Assistant Examiner* — Toan Nguyen
(74) *Attorney, Agent, or Firm* — Brinks Hofer Gilson & Lione (57) ABSTRACT

A method for sending a BFD packet includes: obtaining information about intermediate nodes to be passed by the BFD packet, where the information about the intermediate nodes uniquely corresponds to a link to be traveled by the BFD packet or a session on the link; setting the obtained information about the intermediate nodes into the BFD packet; and sending the BFD packet to a peer through the link corresponding to the information about the intermediate nodes. A method for searching for session ID locally, a link fault detection method and a link fault detection apparatus are provided herein.

6 Claims, 4 Drawing Sheets

OTHER PUBLICATIONS

First Chinese Office Action dated (mailed) Jun. 11, 2010, issued in related Chinese application No. 200710199576.5, Huawei Technologies Co., Ltd.
International Search Report from P.R. China in International Application No. PCT/CN2008/073453 mailed Mar. 19, 2009.
Katz, et al., "Bidirectional Forwarding Detection draft-itef-bfd-base-06.txt", Network Working Group, Internet Draft, Cisco Systems, pp. 1-48, (Mar. 2007).
Katz, et al., "BFD for Multihop Paths draft-ietf-bfd-multihop-05.txt", Network Working Group, Internet Draft, Cisco Systems, pp. 1-7, (Mar. 2007).
Katz, et al., "BFD for IPv4 and IPv6 (Single Hop) draft-ietf-bfd-v4v6-1hop-06.txt", Network Working Group, Internet Draft, Cisco Systems, pp. 1-8, (Mar. 2007).
European Patent Office Communication pursuant to Article 94(3) EPC, European search opinion for Application No. 08871 033.0-2416, mailed Mar. 5, 2012, Huawei Technologies Co., Ltd.

* cited by examiner

METHOD AND APPARATUS FOR SENDING BFD PACKETS, METHOD AND APPARATUS FOR DETECTING LINK FAULTS

CROSS-REFERENCE TO RELATED APPLICATIONS

This application is a continuation of International Application No. PCT/CN2008/073453, filed on Dec. 11, 2008, which claims priority to Chinese Patent Application No. 200710199576.5, filed on Dec. 14, 2007, both of which are hereby incorporated by reference in their entireties.

FIELD OF THE INVENTION

The present invention relates to network technologies, and in particular, to a technology of sending Bidirectional Forwarding Detection (BFD) packets and a technology of detecting link faults.

BACKGROUND

The technology of detecting link faults quickly is more and more important in the network applications. Through such a technology, the network system can discover faults quickly and take the corresponding actions after the link fails. Currently, some transmission media are capable of detecting faults quickly, but other transmission media (such as Ethernet) are not capable of such a function. Therefore, auxiliary detection is generally performed through a Hello mechanism (generally applied to routing protocol). However, the Hello mechanism discovers the fault after at least one second after the fault occurs. On a high-speed link, such a long period of fault detection leads to loss of plenty of data. Therefore, a detection mechanism which is faster and independent of the routing protocol needs to be introduced. Therefore, a BFD protocol is put forward in this field.

The BFD protocol is designed for end-to-end link detection, and the detection takes only microseconds. In the detection, a session is set up between both sides through negotiation first. After the session is set up, both sides send BFD packets to the peer periodically, and detect the state of the link that conveys the BFD packet. If one side receives no BFD packet from the peer within a preset period, the session state changes to "Down", indicating that the link that conveys the BFD packet fails. The BFD packets here refer to various transmission protocol packets of the BFD-related content. In other words, the payload of the protocol packets carries the BFD-related content.

While BFD packets are exchanged between both sides, both sides can negotiate the frequency of sending the BFD packets. If the frequency is higher, the fault detection is faster. In an Internet Protocol Version 4 (IPv4) or Internet Protocol Version 6 (IPv6) network, the format of an encapsulated BFD packet is User Datagram Protocol (UDP)—Internet Protocol (IP). If the session between both sides do not pass through any layer-3 devices, the session is called a single-hop session, and if the session between both sides passes through at least one layer-3 device, the session is called a multi-hop session.

In a network system, many sessions may exist. For identification, the network system needs to allocate a non-zero unique session Identifier (ID) to each session in the network system. For the same session, it is possible that the session ID allocated by one side to the session is different from the session ID allocated by the other side to the session. Therefore, in the negotiation stage of setting up the session, both sides need to learn the session ID allocated by the peer to the session, and input the session ID allocated by the local side and the session ID allocated by the peer to the session into the BFD packet when sending the BFD packet. In this way, after receiving the BFD packet, the peer can resolve the BFD packet to obtain the session ID in the BFD packet correctly, and send the session ID to the corresponding session.

In the initialization negotiation, the sender of the BFD packet (source) has not learned the session ID allocated by the peer (destination) to the session. When sending a BFD packet to the destination, the source inputs 0 as a session ID allocated by the destination to the session in the BFD packet, and such a BFD packet is called an initial BFD packet. After receiving the initial BFD packet, the destination needs to determine the session corresponding to the packet according to other information (such as source IP address, destination IP address, and ingress interface information of the BFD packet) before the destination can learn the session ID allocated by the source to the session. It is the same with the process of sending the initial BFD packet from the destination to the source. The session can be set up only after both sides learn the session ID allocated by the peer to the session. In the process of developing the present invention, the inventor finds that: If multiple links exists between both sides, after the destination receives the initial BFD packet, the destination is unable to know the session corresponding to the initial BFD packet because the destination session ID in the initial BFD packet is 0, and the session setup fails.

Moreover, if multiple links exist between both sides and multiple multi-hop sessions are set up between both sides, when BFD packets are exchanged between both sides, the BFD packet carries only the source IP address, destination IP address, and the session ID allocated by the source to the session, but the session ID allocated by the destination to the session is 0 and multiple sessions are set up between both sides. In this way, when sending or forwarding the BFD packet, the source or the intermediate layer-3 device may select any normal link, and the BFD packet can still arrive at the destination even if a link between both sides fails. After receiving the BFD packet, the destination is unable to know the session corresponding to the BFD packet, or unable to know the link to be detected through this BFD packet, and the fault detection fails.

SUMMARY

The embodiments of the present invention provide a method for sending BFD packets, and a method and an apparatus for searching for local session ID to set up a session between both sides in the case that multiple links exist between both sides.

A method for sending a BFD packet in an embodiment of the present invention includes:

obtaining information about intermediate nodes to be passed by the BFD packet, where the information about the intermediate nodes uniquely corresponds to a link to be traveled by the BFD packet or a session on the link;

setting the obtained information about the intermediate nodes into the BFD packet; and sending the BFD packet to a peer through the link corresponding to the information about the intermediate nodes.

An apparatus for sending a BFD packet in an embodiment of the present invention includes:

an information obtaining unit, configured to: obtain information about intermediate nodes to be passed by the BFD packet, where the information about the intermediate nodes uniquely corresponds to a link traveled by the BFD packet or a session on the link;

an information setting unit, configured to set the intermediate node information obtained by the information obtaining unit into the BFD packet; and a packet sending unit, configured to send the BFD packet to a peer, where the BFD packet travels the link corresponding to the intermediate node information.

A method and an apparatus for detecting link faults are provided in an embodiment of the present invention to detect a link fault effectively.

A method for detecting a link fault in an embodiment of the present invention includes:

judging whether a BFD packet corresponding to a session is received, where the BFD packet carries information about intermediate nodes passed by the BFD packet; and if the BFD packet is received, determining that the link corresponding to the session runs normally; otherwise, determining that the link corresponding to the session runs abnormally.

An apparatus for detecting a link fault in an embodiment of the present invention includes:

a packet receiving unit, configured to receive a BFD packet corresponding to a session; and a judging unit, configured to: judge whether the packet receiving unit receives the BFD packet corresponding to the session, and determine that the link corresponding to the session runs normally if the packet receiving unit receives the BFD packet, or determine that the link corresponding to the session runs abnormally if the packet receiving unit receives no such BFD packet.

Through the method for sending the BFD packet, the BFD packet sent by the source carries the information about the intermediate nodes to be passed by the BFD packet, the intermediate node information uniquely corresponds to the link to be traveled by the BFD packet or the session on the link, and the destination receives the BFD packet that carries the intermediate node information. Because the intermediate node information already specifies the link corresponding to the BFD packet, after the destination receives the intermediate node information, the destination determines the session corresponding to the BFD packet, and can set up the session with the source.

Through the method for sending the BFD packet, and the method and apparatus for detecting link faults in the embodiments of the present invention, the BFD packet sent by one side carries the information about the intermediate nodes to be passed by the BFD packet, and the intermediate node information uniquely corresponds to the link to be traveled by the BFD packet or the session on the link. In this way, the sender of the BFD packet or an intermediate layer-3 device needs to send or forward the BFD packet according to the intermediate node information. In other words, the BFD packet travels the link corresponding to the session strictly until it arrives at the destination. Therefore, the receiver determines that the link corresponding to the intermediate node information carried in the BFD packet runs normally if the BFD packet is received, or determines that the link corresponding to the intermediate node information runs abnormally if the BFD packet is not received. In this way, effective fault detection is implemented.

DETAILED DESCRIPTION OF THE EMBODIMENTS

Figure 1:
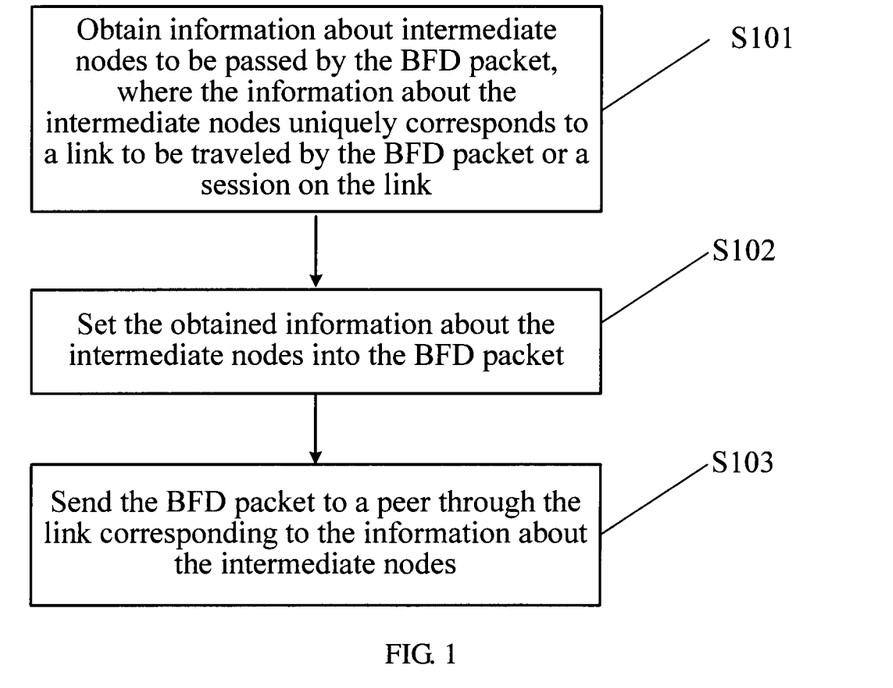
FIG. 1 is a flowchart of a method for sending a BFD packet in an embodiment of the present invention.

First, a method for sending a BFD packet in an embodiment of the present invention is described below. As shown in FIG. 1, the method includes the following steps:

Step S101: Obtain information about intermediate nodes to be passed by the BFD packet, where the information about the intermediate nodes uniquely corresponds to a link to be traveled by the BFD packet or a session on the link.

Specifically, the intermediate node information may be ID of the intermediate node, address of the intermediate node, or other information that identifies the intermediate node, or any combination thereof. The information about the intermediate nodes to be passed by the BFD packet may be preset, and may be retrieved locally when required. Nevertheless, such information may also be obtained from other network entities. Besides, if no session has been set up with the peer, namely, the packet to be sent is an initial BFD packet, the intermediate node information uniquely corresponds to a link to be traveled by the BFD packet; if a session has been set up with the peer, namely, the packet to be sent is a BFD packet for detecting faults, the intermediate node information uniquely corresponds to a link to be traveled by the BFD packet or a session on the link.

Step S102: Set the obtained information about the intermediate nodes into the BFD packet.

Specifically, the information about the intermediate nodes may be set into the header of the BFD packet through source site routing or through a routing header. Source site routing is an IP option of IPv4, and a routing header is an extended packet header of IPv6, both being based on this idea: The source specifies the route, and sets a list of the IP addresses of the intermediate nodes into the IP header. At time of forwarding the BFD packet that carries a list of IP addresses of the intermediate nodes, the list of IP addresses needs to be observed to ensure that the BFD packet passes the specified nodes. For example, when each node receives a packet, the node needs to check the IP addresses of the intermediate nodes in the IP header. In this way, it is ensured that the packet is sent to the next node, and the BFD packet always travels the route specified by the source. In other words, the BFD packet always travels the link corresponding to the list of IP addresses of the intermediate nodes. Nevertheless, the source site routing mode and the routing header mode are optional. In practice, the intermediate node information may be set into the BFD packet in other modes. Generally, the intermediate node information needs to be set in the header of the BFD packet. If every node can identify the intermediate node information, the intermediate node information may also be set in other parts of the BFD packet. If the BFD packet is an initial BFD packet, the initial BFD packet needs to carry the session ID allocated by the local side to the session. In this way, after the peer receives the initial BFD packet, the peer can find the session ID allocated by the peer to the session according to the intermediate node information, and can determine that the session ID carried in the initial BFD packet is the found session ID allocated by the peer to the session. That is, the peer can preset a mapping relation between the intermediate node information and the session ID allocated by the peer to the session. If the peer corresponds to multiple links, the peer needs to set up multiple mapping relations. In this way, after receiving the initial BFD packet, the peer can find the session ID allocated by the peer to the session according to the intermediate node information, and can correlate the session ID allocated by the peer to the session with the session ID carried in the initial BFD packet.

If the sent BFD packet is an BFD packet existent after the session is set up, the BFD packet may also carry the session ID allocated by the local side to the session. In this way, after receiving the BFD packet, the peer finds the correlated session ID allocated by the peer to the session according to the session ID carried in the BFD packet, knows the session corresponding to the BFD packet, and knows the link traveled by the BFD packet. Nevertheless, the BFD packet may carry no session ID allocated by the local side to the session. That is because the intermediate node information carried in the BFD packet already indicates the link traveled by the BFD packet. After receiving the BFD packet, the peer can determine the link traveled by the BFD packet according to the intermediate node information carried in the BFD packet, and the peer can judge whether the link is faulty according to the link traveled by the BFD packet, which will be detailed later herein.

The BFD packet may be an IP packet, and the IP packet carries BFD-related content. Nevertheless, the BFD packet may be another type of packet if practicable.

Step S103: Send the BFD packet to a peer through the link corresponding to the information about the intermediate nodes.

As mentioned in step S102, after the intermediate node information is set in the BFD packet, the BFD packet travels the link corresponding to the intermediate node information strictly. If the corresponding link fails, even if other links directed to the peer run normally, the BFD packet does not arrive at the peer along other links. The final result is: The BFD packet that does not travel the link corresponding to the intermediate node information arrives at the peer, namely, the peer is unable to receive the BFD packet that travels the link corresponding to the intermediate node information.

It is worthy of attention that the entity that performs step S101, step S102, and step S103 is the source that sends the BFD packet, and multiple links exist between the source and the destination.

The sending method above may be implemented by different apparatuses. One of the BFD packet sending apparatuses includes:

an information obtaining unit, configured to: obtain information about intermediate nodes to be passed by the BFD packet, where the information about the intermediate nodes uniquely corresponds to a link traveled by the BFD packet or a session on the link;

an information setting unit, configured to set the intermediate node information obtained by the information obtaining unit into the BFD packet; and a packet sending unit, configured to send the BFD packet to a peer, where the BFD packet travels the link corresponding to the intermediate node information.

Specifically, the intermediate node information may be ID of the intermediate node, address of the intermediate node, or other information that identifies the intermediate node, or any combination thereof. The information about the intermediate nodes to be passed by the BFD packet may be preset locally, and may be retrieved locally by the information obtaining unit when required. Nevertheless, such information may also be obtained from other network entities. Besides, if no session has been set up with the peer, namely, the packet to be sent by the packet sending unit is an initial BFD packet, the intermediate node information uniquely corresponds to a link to be traveled by the BFD packet; if a session has been set up with the peer, namely, the packet to be sent by the packet sending unit is a BFD packet for detecting faults, the intermediate node information uniquely corresponds to a link to be traveled by the BFD packet or a session on the link.

The information setting unit may set the intermediate node information into the header of the BFD packet through source site routing or through a routing header. Nevertheless, the source site routing mode and the routing header mode are optional. In practice, the information setting unit may set the intermediate node information into the BFD packet in other modes. Generally, the intermediate node information needs to be set in the header of the BFD packet. If every node can identify the intermediate node information, the intermediate node information may also be set in other parts of the BFD packet.

If the BFD packet sent by the packet sending unit is an initial BFD packet, the initial BFD packet needs to carry the session ID allocated by the local side to the session. In this way, after receiving the initial BFD packet, the peer can find the session ID allocated by the peer to the session according to the intermediate node information, and can determine that the session ID carried in the initial BFD packet is the found session ID allocated by the peer to the session. That is, the peer can preset a mapping relation between the intermediate node information and the session ID allocated by the peer to the session. If the peer corresponds to multiple links, the peer needs to set up multiple mapping relations. In this way, after receiving the initial BFD packet, the peer can find the session ID allocated by the peer to the session according to the intermediate node information, and can correlate the session ID allocated by the peer to the session with the session ID carried in the initial BFD packet.

If the BFD packet sent by the packet sending unit is an BFD packet existent after the session to the peer is set up, the BFD packet may also carry the session ID allocated by the local side to the session. In this way, after receiving the BFD packet, the peer finds the correlated session ID allocated by the peer to the session according to the session ID carried in the BFD packet, knows the session corresponding to the BFD packet, and knows the link traveled by the BFD packet. Nevertheless, the BFD packet may carry no session ID allocated by the local side to the session. That is because the intermediate node information carried in the BFD packet already indicates the link traveled by the BFD packet. After receiving the BFD packet, the peer can determine the link traveled by the BFD packet according to the intermediate node information carried in the BFD packet, and the peer can judge whether the link is faulty according to the link traveled by the BFD packet.

The BFD packet sent by the packet sending unit may be an IP packet, and the IP packet carries BFD-related content. Nevertheless, the BFD packet may be another type of packet if practicable.

As mentioned above, after the information setting unit sets the intermediate node information into the BFD packet, the BFD packet travels the link corresponding to the intermediate node information strictly. If the corresponding link fails, even if other links directed to the peer run normally, the BFD packet does not arrive at the peer along other links. The final result is: The BFD packet that does not travel the link corresponding to the intermediate node information arrives at the peer, namely, the peer is unable to receive the BFD packet that travels the link corresponding to the intermediate node information.

The units in the sending apparatus above may be applied on the source side, and the working mode of such units on the source side is the same as the working mode in the sending apparatus above.

Figure 2:
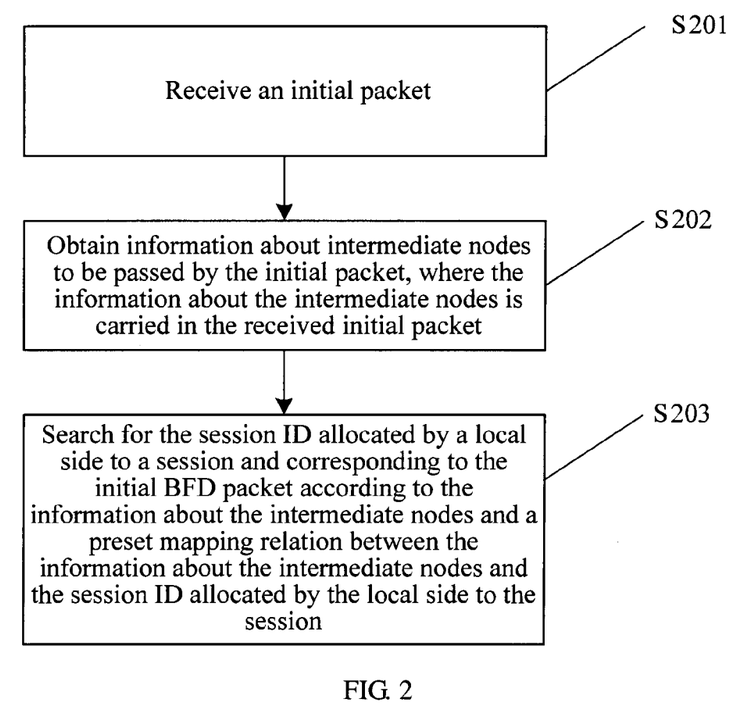
FIG. 2 is a flowchart of a method for searching for a session ID of the peer in an embodiment of the present invention.

The sending method and the sending apparatus described above deal with the scenario that a BFD packet is sent from the source. If an initial BFD packet is sent instead, the destination needs to search for the session ID allocated by the destination to the session after receiving the initial BFD session. FIG. 2 shows a method for searching for a session ID on a local side (in this embodiment, the local side is the destination). As shown in FIG. 2, the method includes the following steps:

Step S201: Receive an initial BFD packet.

Step S202: Obtain information about intermediate nodes to be passed by the initial BFD packet, where the information about the intermediate nodes is carried in the received initial BFD packet.

The intermediate node information may be ID of the intermediate node, address of the intermediate node, or other information that identifies the intermediate node, or any combination thereof. Specifically, the information about the intermediate nodes may be set into the header of the BFD packet through source site routing or through a routing header. Nevertheless, the source site routing mode and the routing header mode are optional. In practice, the intermediate node information may be set into the BFD packet in other modes. Generally, the intermediate node information needs to be set in the header of the BFD packet. If every node can identify the intermediate node information, the intermediate node information may also be set in other parts of the BFD packet.

The information about the intermediate nodes to be passed by the initial BFD packet may be obtained from the initial BFD packet after the initial BFD packet is received from the source.

Step S203: Search for a session ID allocated by a local side to a session and corresponding to the initial BFD packet according to the information about the intermediate nodes and a preset mapping relation between the information about the intermediate nodes and the session ID allocated by the local side to the session.

Specifically, a mapping relation may be set for each session, namely, a mapping relation between the session ID allocated by the local side to the session and the information about the intermediate nodes on the link. In this way, after the intermediate node information is obtained, the session ID allocated by the local side to the session can be found according to the intermediate node information. The initial BFD packet may be an IP packet, and the IP packet generally carries a source IP address and a destination IP address. Therefore, at the time of setting a mapping relation for the session, mapping relations may be set up among the session ID allocated by the local side to the session, the source IP address, the destination IP address, and the information about the intermediate nodes on the link. After the initial BFD packet is obtained, the session ID allocated by the local side to the session can be found according to the intermediate node information, source IP address, and destination IP address. After the session ID corresponding to the initial BFD packet and allocated by the local side to the session is found, the local side can record the mapping relation between the session ID allocated by the local side to the session and the session ID allocated by the source to the session, where the session ID allocated by the source to the session is carried in the initial BFD packet. After the mapping relation between the session ID allocated by the local side and the session ID allocated by the source is also set up on the source side, a session is set up between the local side and the source.

The mapping relation between the session ID allocated by the local side and the session ID allocated by the source may be set up on the source side in many modes.

For example, after the local side records the mapping relation between the two session IDs, the local side may send a link setup packet to the source. The link setup packet carries the two session IDs. After receiving the link setup packet, the source may obtain the two session IDs from the link setup packet directly, and set up a mapping relation between the two session IDs. The link setup packet may carry the intermediate node information. In this case, the link setup packet travels the link corresponding to the intermediate node information strictly until it arrives at the source.

In another example, when the source sends an initial BFD packet to the local side, the local side may also send an initial BFD packet to the source. The initial BFD packet sent by the local side to the source carries intermediate node information and the session ID allocated by the local side to the session. After receiving the initial BFD packet, the source obtains the intermediate node information, and then finds the session ID allocated by the source to the session according to the preset mapping relation between the intermediate node information and the session ID allocated by the source to the session, thus setting up a mapping relation between the session ID allocated by the source to the session and the session ID allocated by the local side to the session, where the session ID allocated by the local side to the session is carried in the initial BFD packet.

It is worthy of attention that the entity that performs step S201, step S202, and step S203 is the destination that receives the initial BFD packet, and multiple links exist between the source and the destination.

The searching method above may be implemented by different apparatuses. One of the apparatuses for searching for a session ID locally includes:

a packet receiving unit, configured to receive an initial BFD packet;

an information obtaining unit, configured to obtain information about intermediate nodes to be passed by the initial BFD packet, where the information about the intermediate nodes is carried in the initial BFD packet received by the packet receiving unit; and an ID searching unit, configured to search for a session ID allocated by a local side to a session and corresponding to the initial BFD packet according to the intermediate node information obtained by the information obtaining unit and a preset mapping relation between the intermediate node information and the session ID allocated by the local side to the session.

The foregoing apparatus may further include a mapping relation setting unit, which is configured to set up a mapping relation for each session, namely, a mapping relation between the session ID allocated by the local side to the session and the information about the intermediate nodes on the link. In this way, after the information obtaining unit obtains the intermediate node information, the ID searching unit may search for the session ID allocated by the local side to the session in the mapping relation setting unit according to the intermediate node information. The initial BFD packet may be an IP packet, and the IP packet generally carries a source IP address and a destination IP address. Therefore, when setting a mapping relation for the session, the mapping relation setting unit may set up the mapping relations between the session ID allocated by the local side to the session, the source IP address, the destination IP address, and the information about the intermediate nodes on the link. After the packet receiving unit receives the initial BFD packet, the session ID determining unit can find the session ID allocated by the local side to the session according to the intermediate node information, source IP address, and destination IP address.

The units in the searching apparatus above may be applied on the destination side, and the working mode of such units on the destination side is the same as the working mode in the searching apparatus above.

As mentioned above in the embodiment shown in FIG. 1, the source sends the BFD packet for detecting the link fault to the local side (namely, destination) and the BFD packet carries the information about the intermediate nodes to be passed by the BFD packet, with a view to ensuring that the BFD packet can arrive at the local side along the link corresponding to the intermediate node information strictly. If the link corresponding to the intermediate node information fails, the BFD packet will not arrive at the local side, and the BFD packet will not arrive at the local side along other normal links. In this way, no BFD packet arrives at the local side along the link corresponding to the intermediate node information. Even if the local side receives the BFD packets that travel other links, because these BFD packets carry the intermediate node information different from that of the faulty link and carry the session IDs allocated by both sides to the session, the local side can differentiate between the links corresponding to these BFD packets, and will not regard such BFD packets as the BFD packet corresponding to the faulty link.

As mentioned in the embodiment of the method for searching for a local ID locally in FIG. 2, a mapping relation exists between the session ID allocated by the local side to the session and the information about the intermediate nodes on the link.

Figure 3:
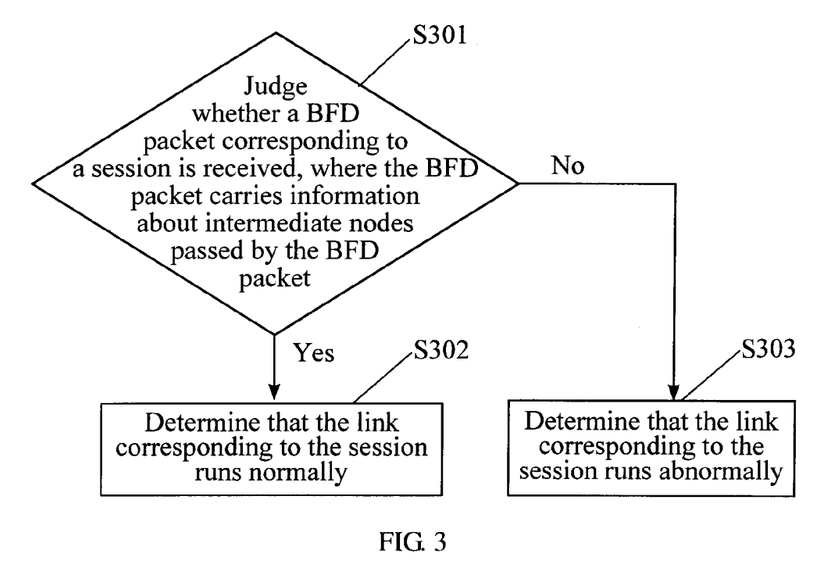
FIG. 3 is a flowchart of a link fault detection method in an embodiment of the present invention.

If a session is already set up between both sides and multiple links exist between both sides, the BFD packet sent by the source is designed for detecting link faults. Therefore, after receiving the BFD packet, the destination needs to detect the link fault through the BFD packet. FIG. 3 shows a link fault detection method in an embodiment of the present invention. As shown in FIG. 3, the method includes the following steps:

Step S301: Judge whether a BFD packet corresponding to a session is received, where the BFD packet carries information about intermediate nodes passed by the BFD packet. If a BFD packet corresponding to the session is received, go to step S302; otherwise, go to step S303.

Step S302: Determine that the link corresponding to the session runs normally.

Step S303: Determine that the link corresponding to the session runs abnormally.

Specifically, a timer may be set for each session. The timers may have the same timing period or different timing periods. If a BFD packet corresponding to a session is received within the timing period, the local side determines that the link corresponding to the session runs normally, and then continues monitoring the session. Optionally, before continuing monitoring the session, the local side may reset the timer, and the new timing period may be the same as the old timing period or different from the old timing period. If no BFD packet corresponding to a session is received within the timing period, the local side determines that the link corresponding to the session runs abnormally, and then takes actions to handle the exception. If it is necessary to continue monitoring the session, the local side may reset the timer, and the new timing period may be the same as the old timing period or different from the old timing period.

In practice, many methods may be used to judge whether the BFD packet corresponding to a session is received within the timing period. Two of the judging methods are described below.

The first judging method is to check the session IDs and the intermediate node information carried in a received BFD packet after all timers are started, where the session IDs are allocated by both sides to the session. The session corresponding to the BFD packet may be determined according to the session IDs allocated by both sides to the session. When the source sends the BFD packet, the BFD packet carries the intermediate node information corresponding to the session IDs allocated by both sides to the session to ensure that the BFD packet arrives at the local side along the intermediate nodes corresponding to the session IDs allocated by both sides to the session. Therefore, at the time of checking the intermediate node information, if the BFD packet carries the intermediate node information, it is determined that the BFD packet is transmitted along the intermediate nodes corresponding to the session IDs allocated by both sides to the session. After the session corresponding to the BFD packet is determined and it is determined that the BFD packet is transmitted along the intermediate nodes corresponding to the session IDs allocated by both sides to the session, it is determined that the BFD packet corresponds to the session corresponding to the session IDs allocated by both sides to the session. If the timer corresponding to the session has not expired, it is determined that the BFD packet corresponding to the session is received within the timing period.

Optionally, at the time of checking the session IDs and the intermediate node information carried in the BFD packet, where the session IDs are allocated by both sides to the session, the checking method is to check whether the session IDs carried in the BFD packet correspond to the intermediate node information carried in the BFD packet. If the session IDs correspond to the intermediate node information, it is determined that the BFD packet is transmitted along the intermediate nodes corresponding to the session IDs allocated by both sides to the session. For example, the local side may search for the intermediate node information corresponding to the session IDs allocated by both sides to the session locally according to the session IDs carried in the BFD packet, and compare the found intermediate node information with the intermediate node information carried in the BFD packet. If the information is consistent, it indicates that the BFD packet is transmitted along the intermediate nodes corresponding to the session IDs allocated by both sides to the session. Otherwise, it indicates that the BFD packet carries the session IDs allocated by both sides to the session, but the BFD packet is transmitted along the intermediate nodes not corresponding to the session IDs allocated by both sides to the session, and therefore, the local side determines that the BFD packet does not correspond to the session corresponding to the session IDs allocated by both sides to the session. In this case, the local side may find the session IDs allocated by both sides to the session and corresponding to the intermediate node information locally according to the intermediate node information carried in the BFD packet, and determine the session corresponding to the BFD packet exactly.

The second judging method is to find the session IDs allocated by both sides to the session and corresponding to the intermediate node information locally according to the intermediate node information carried in the BFD packet if the BFD packet is received after all timers are started, and therefore, determine the session corresponding to the BFD packet; and then judge whether the timer corresponding to the session expires, and determine that the BFD packet corresponding to the session is received within the timing period if the timer does not expire.

Nevertheless, the two judging methods above are optional. In practice, those skilled in the art may use other methods to judge whether a BFD packet of a session is received within the timing period.

If the local side receives the BFD packet corresponding to a session, it is determined that the link corresponding to the session runs normally; otherwise, it is determined that the link corresponding to the session runs abnormally.

It is worthy of attention that the entity that performs step S301, step S302, and step S303 is the destination that receives the BFD packet, and multiple links exist between the source and the destination.

The link fault detection method in the foregoing embodiments may be implemented by different apparatuses. One of the apparatuses for detecting a link fault includes:

a packet receiving unit, configured to receive a BFD packet corresponding to a session; and a judging unit, configured to: judge whether the packet receiving unit receives the BFD packet corresponding to the session, and determine that the link corresponding to the session runs normally if the packet receiving unit receives the BFD packet, or determine that the link corresponding to the session runs abnormally if the packet receiving unit receives no such BFD packet.

The apparatus may further include a mapping relation setting unit, which is configured to set a mapping relation between the session IDs allocated by the local side to the session and the information about intermediate nodes on the link.

The judging unit may include multiple timers, and each timer corresponds to a session. The judging unit judges whether the packet receiving unit receives the BFD packet corresponding to the session within the timing period of the timer.

The units in the detecting apparatus above may be applied on the destination side, and the working mode of such units on the destination side is the same as the working mode in the detecting apparatus above.

Figure 4:
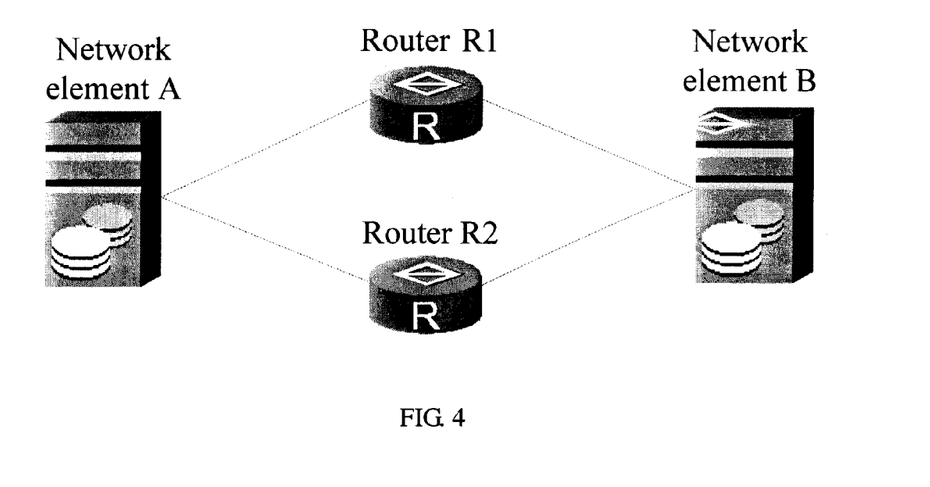
FIG. 4 shows a link in an application embodiment of the present invention.
Figure 5:
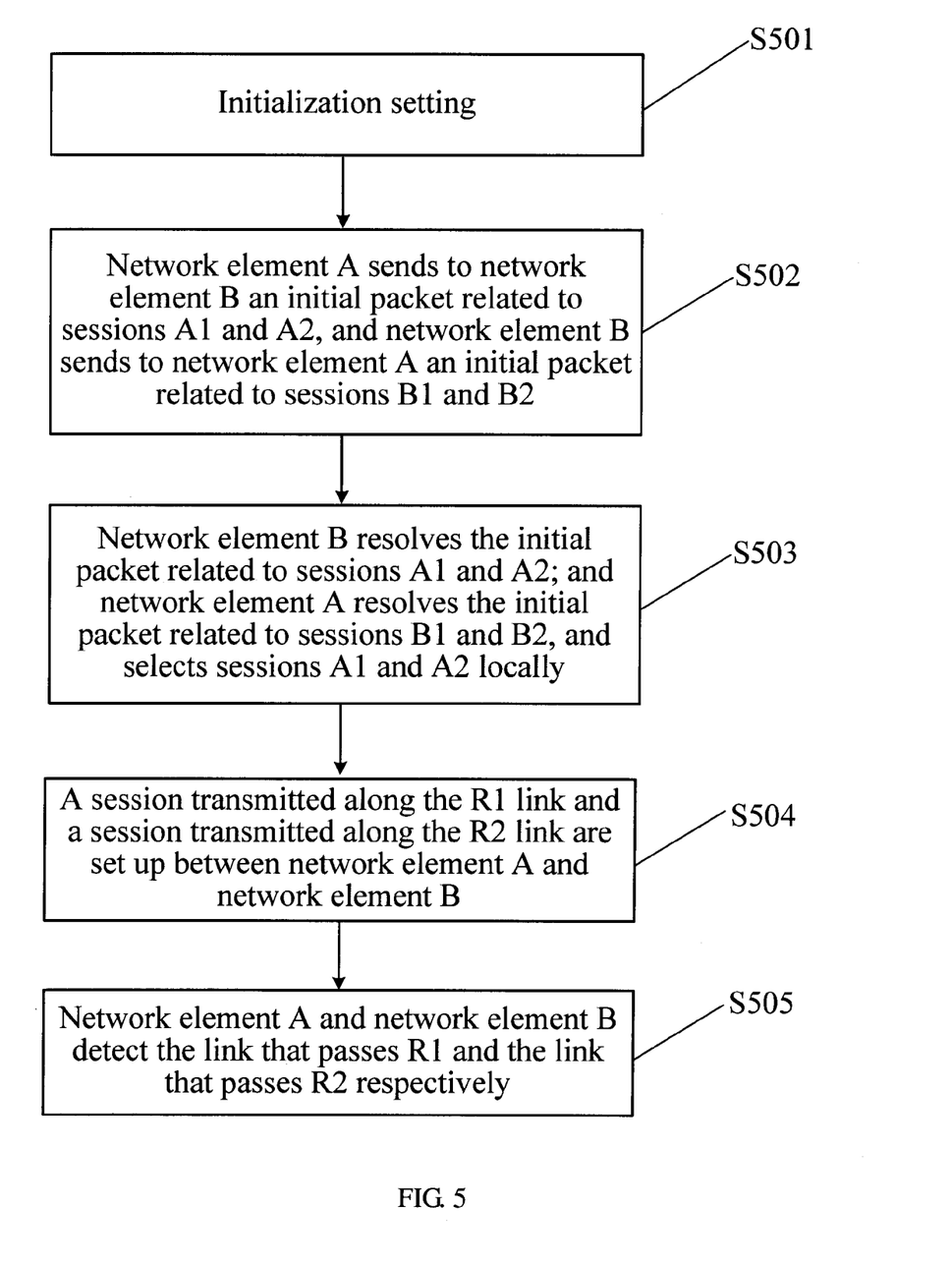
FIG. 5 is a flowchart of an application embodiment of the present invention.

An application embodiment of the present invention is described below with reference to FIG. 4 and FIG. 5. As shown in FIG. 4, two links exist between network element A and network element B, namely, a link that passes router R1 and a link that passes router R2; two balancing routes are configured to share load of network traffic; and the IP addresses of A, B, R1, and R2 are IP_A, IP_R1, and IP_R2 respectively. Now two multi-hop sessions need to be set up between A and B for detecting the link that passes R1 and R2 respectively. As shown in FIG. 5, the process includes the following steps:

Step S501: Initial setting is performed. Specifically, two multi-hop sessions A1 and A2 are configured on network element A, and two multi-hop sessions B1 and B2 are configured on network element B, with a view to setting up a connection between A1 and B1 for detecting the link that passes R1, and setting up a connection between A2 and B2 for detecting the link that passes R2. The detailed configuration scheme is shown in Table 1:

TABLE 1

| Session | Source IP address | Destination IP address | List of IP addresses of intermediate nodes |
| --- | --- | --- | --- |
| A1 | IP_A | IP_B | IP_R1 |
| A2 | IP_A | IP_B | IP_R2 |
| B1 | IP_B | IP_A | IP_R1 |
| B2 | IP_B | IP_A | IP_R2 |

Step S502: Network element A sends to network element B an initial BFD packet related to sessions A1 and A2, and network element B sends to network element A an initial BFD packet related to sessions B1 and B2. The initial BFD packet related to session A1 carries IP_R1 as a list of IP addresses, the initial BFD packet related to session A2 carries IP_R2 as a list of IP addresses, the initial BFD packet related to session B1 carries IP_R1 as a list of IP addresses, and the initial BFD packet related to session B2 carries IP_R2 as a list of IP addresses.

Step S503: Network element B resolves the initial BFD packet related to sessions A1 and A2, and selects sessions B1 and B2 locally. Network element A resolves the initial BFD packet related to sessions B1 and B2, and selects sessions A1 and A2 locally.

Step S504: A session transmitted along the R1 link and a session transmitted along the R2 link are set up between network element A and network element B.

Step S505: Network element A and network element B detect the link that passes R1 and the link that passes R2 respectively. Specifically, network element A judges whether a BFD packet that carries IP_R1 is received from network element B within the timing period. If such a BFD packet is received within the timing period, network element A determines that the R1 link corresponding to the IP_R1 carried in the BFD packet is normal; otherwise, according to the session IDs A1 and B1, network element A determines that the intermediate node is R1, and determines that the R1 link is abnormal. Likewise, network element A may judge whether a BFD packet that carries IP_R2 is received from network element B within the timing period. If such a BFD packet is received within the timing period, network element A determines that the R2 link corresponding to the IP_R2 carried in the BFD packet is normal; otherwise, according to the session IDs A2 and B2, network element A determines that the intermediate node is R2, and determines that the R2 link is abnormal. Network element B judges whether a BFD packet that carries IP_R1 is received from network element A within the timing period. If such a BFD packet is received within the timing period, network element B determines that the R1 link corresponding to the IP_R1 carried in the BFD packet is normal; otherwise, according to the session IDs A1 and B1, network element B determines that the intermediate node is R1, and determines that the R1 link is abnormal. Likewise, network element B may judge whether a BFD packet that carries IP_R2 is received from network element A within the timing period. If such a BFD packet is received within the timing period, network element B determines that the R2 link corresponding to the IP_R2 carried in the BFD packet is normal; otherwise, according to the session IDs A2 and B2, network element B determines that the intermediate node is R2, and determines that the R2 link is abnormal.

In all embodiments of the present invention, the sent or received BFD packet carries intermediate node information, and the destination may find the local corresponding session ID according to the intermediate node information carried in the initial BFD packet, and may obtain the session ID allocated by the source to the session from the initial BFD packet, and set up a mapping relation between the session ID allocated by the source and the session ID allocated by the destination to the session so that a session can be set up between both sides. Moreover, in the link detection process, the destination may judge whether the link corresponding to the intermediate node fails according to the intermediate node information.

Persons of ordinary skilled in the art should understand that all or part of the steps of the method under the present invention may be implemented by a program instructing relevant hardware. The program may be stored in a computer readable storage medium. When the program runs, the steps of the method under the present invention are performed. The storage medium may be a magnetic disk, Compact Disk (CD), Read-Only Memory (ROM), or Random Access Memory (RAM).

Although the invention is described through some exemplary embodiments, the invention is not limited to such embodiments. It is apparent that those skilled in the art can make modifications and variations to the invention without departing from the scope of the invention. The invention is intended to cover the modifications and variations provided that they fall in the scope of protection defined by the following claims or their equivalents.

What is claimed is:

1. A method for setting up a session, wherein the session corresponds to a link between a source side and a destination side; the source side allocates a first session ID corresponding to the session; the destination side allocates a second session ID corresponding to the session and presets a mapping relation between intermediate nodes of the link and the second session ID; the method comprising:
   sending, by the source side, an initial BFD packet to the destination side, wherein the initial BFD packet carries the first session ID and information about intermediate nodes of the link so that the initial BFD packet is sent to the destination side along the intermediate nodes of the link;
   receiving, by the destination side, the initial BFD packet;
   obtaining, by the destination side, the information about intermediate nodes;
   searching for, by the destination side, the second session ID according to the mapping relation and the information about intermediate nodes;
   setting up, by the destination side, a mapping relation between the first session ID and the second session ID for setting up the session.

2. The method according to claim 1, wherein the source side sets the information about intermediate nodes into a header of the initial BFD packet through source site routing or through a routing header.

3. The method according to claim 1, wherein the information about the intermediate nodes comprises at least:
   identifiers (IDs) of the intermediate nodes; or
   addresses of the intermediate nodes; or
   other information that can identify the intermediate nodes; or
   any combination thereof.

4. The method according to claim 1, wherein the initial BFD packet is an Internet Protocol (IP) packet which carries a source IP address and a destination IP address; the step of searching comprising: searching for the second session ID according to the source IP address, the destination IP address, the mapping relation and the information about intermediate nodes.

5. A method for detecting a fault of a link in a destination side, wherein the link is established between a source side and the destination side and a session is set up for the link; the destination side allocates a second session ID corresponding to the session and presets a mapping relation between intermediate nodes of the link and the second session ID; the method comprising:
   receiving, by the destination side, a Bidirectional Forwarding Detection (BFD) packet from the source side; wherein the BFD packet carries the second session ID and information about intermediate nodes passed by the BFD packet;
   searching, by the destination side, for information about the intermediate nodes of the link according to the mapping relation and the second session ID;
   determining, by the destination side, the link runs abnormally if the intermediate nodes passed by the BFD packet is not the same as the intermediate nodes of the link;
   determining, by the destination side, the link runs normally if the intermediate nodes passed by the BFD packet is the same as the intermediate nodes of the link.

6. An system for setting up a session, comprising: a source side and a destination side; wherein the session corresponds to a link between the source side and the destination side;
   the source side, being configured to allocate a first session ID corresponding to the session, send an initial BFD packet to the destination side, wherein the initial BFD packet carries the first session ID and information about intermediate nodes of the link so that the initial BFD packet is sent to the destination side along the intermediate nodes of the link;
   the destination side, being configured to allocate a second session ID corresponding to the session, preset a mapping relation between intermediate nodes of the link and the second session ID, receive the initial BFD packet, obtain the information about intermediate nodes, search for the second session ID according to the mapping relation and the information about intermediate nodes and set up a mapping relation between the first session ID and the second session ID for setting up the session.

* * * * *